(12) United States Patent
Larcher et al.

(10) Patent No.: US 7,939,462 B2
(45) Date of Patent: May 10, 2011

(54) COMPOSITION BASED ON CERIUM AND ZIRCONIUM OXIDES HAVING A SPECIFIC SURFACE WHICH IS STABLE BETWEEN 900° C AND 1000° C METHOD FOR THE PRODUCTION AND USE THEREOF AS A CATALYST

(75) Inventors: Olivier Larcher, Perigny (FR); Emmanuel Rohart, Sainte Soulle (FR); David Monin, Paris (FR)

(73) Assignee: Rhodia Operations, Aubervilliers (FR)

( * ) Notice: Subject to any disclaimer, the term of this patent is extended or adjusted under 35 U.S.C. 154(b) by 1280 days.

(21) Appl. No.: 10/549,530

(22) PCT Filed: Mar. 17, 2004

(86) PCT No.: PCT/FR2004/000649
§ 371 (c)(1),
(2), (4) Date: Jun. 26, 2006

(87) PCT Pub. No.: WO2004/085314
PCT Pub. Date: Oct. 7, 2004

(65) Prior Publication Data
US 2006/0263284 A1 Nov. 23, 2006

(30) Foreign Application Priority Data
Mar. 18, 2003 (FR) .................................... 03 03291

(51) Int. Cl.
*B01J 23/10* (2006.01)
(52) U.S. Cl. ...... 502/304; 502/349; 501/103; 423/213.2

(58) Field of Classification Search .................. 502/304, 502/439; 501/103, 152; 423/213.2, 263
See application file for complete search history.

(56) References Cited

U.S. PATENT DOCUMENTS

| 4,590,052 | A | 5/1986 | Chevallier et al. |
| 5,532,198 | A | 7/1996 | Chopin et al. |
| 5,723,101 | A | 3/1998 | Cuif |
| 5,958,827 | A * | 9/1999 | Suda et al. .................... 502/304 |
| 6,228,799 | B1 | 5/2001 | Aubert et al. |

FOREIGN PATENT DOCUMENTS

| EP | 0 955 267 A1 | 12/1997 |
| EP | 1 017 663 B1 | 7/2000 |
| EP | 0882784 B1 | 10/2002 |

OTHER PUBLICATIONS

S. Brunauer et al., "Adsorption of Gases in Multimolecular Layers", *J. Chem. Soc*, vol. 30, Feb. 1938, pp. 309-319.

* cited by examiner

*Primary Examiner* — Patrick Ryan
*Assistant Examiner* — Heng M Chan
(74) *Attorney, Agent, or Firm* — Buchanan Ingersoll & Rooney, P.C.

(57) ABSTRACT

The inventive composition, according to a first embodiment, consists essentially of a cerium oxide and a zirconium oxide. According to a second embodiment, said composition is based on cerium oxide, zirconium oxide and at least one rare earth oxide other than cerium. After a first 4-hour period of calcination at 900 .C followed by a second 10-hour period of at 1000 .C, the specific surface variation thereof is 20% maximum in the first embodiment and 15% maximum in the second embodiment. The inventive composition can be used as a catalyst, i.e. in the treatment of waste gases from internal combustion engines.

26 Claims, No Drawings

COMPOSITION BASED ON CERIUM AND ZIRCONIUM OXIDES HAVING A SPECIFIC SURFACE WHICH IS STABLE BETWEEN 900° C AND 1000° C METHOD FOR THE PRODUCTION AND USE THEREOF AS A CATALYST

This application is an application under 35 U.S.C. Section 371 of International Application Number PCT/FR2004/000649 filed on Mar. 17, 2004.

The present invention relates to compositions based on a cerium oxide, a zirconium oxide and, optionally, an oxide of another rare earth, having a specific surface area that is stable between 900° C. and 1000° C., to its method of preparation and to its use as a catalyst.

It is known today that zirconium oxide and cerium oxide appear to be two particularly advantageous constituents of catalysts for the treatment of exhaust gases from internal combustion engines (by automobile postcombustion catalysis), in particular for catalysts called "multifunctional". Multifunctional catalysts are understood to mean those capable of carrying out not only oxidation, in particular of carbon monoxide and the hydrocarbons present in exhaust gases, but also reduction, in particular of nitrogen oxides also present in these gases ("three-way" catalysts).

Catalysts of this type currently available are generally capable of preserving a relatively high specific surface area for temperatures of between about 900° C. and 1200° C. However, the change in this surface area between the two above temperature limits may be very substantial in the case of the known catalyst, and there is a need for products exhibiting only a small relative change in surface area within this temperature range. This is because a small change makes it possible to reduce the sintering of the precious metals that are deposited on the catalysts and therefore to make these metals more accessible throughout the temperature range in question.

The object of the invention is to develop such products.

For this purpose, and in a first embodiment, the composition of the invention essentially consists of a cerium oxide and a zirconium oxide, and it is characterized in that, after a first calcination at 900° C. for 4 hours followed by a second calcination at 1000° C. for 10 hours, it exhibits a change in its specific surface area of at most 20%.

According to a second embodiment, the composition of the invention is based on a cerium oxide, a zirconium oxide and at least one oxide of a rare earth other than cerium, and it is characterized in that, after a first calcination at 900° C. for 4 hours followed by a second calcination at 1000° C. for 10 hours, it exhibits a change in its specific surface area of at most 15%.

The invention also relates to a method for preparing such compositions which is characterized in that it comprises the following steps:

(a) a mixture comprising a cerium compound, a zirconium compound and, if appropriate, a compound of the aforementioned rare earth is formed;
(b) said mixture is brought into contact with a basic compound, by means of which a precipitate is obtained;
(c) said precipitate is heated in aqueous medium;
(d) a surfactant of the carboxymethylated fatty alcohol ethoxylate type is added to the precipitate obtained in the previous step; and
(e) the precipitate thus obtained is calcined.

Other features, details and advantages of the invention will become even more fully apparent on reading the following description, and from specific but nonlimiting examples intended to illustrate it.

The term "specific surface area" is understood to mean the BET specific surface area determined by nitrogen adsorption in accordance with the ASTM D 3663-78 standard established on the basis of the Brunauer—Emmett—Teller method described in the periodical *The Journal of the American Chemical Society*, 60, 309 (1938).

The term "rare earth" is understood to mean elements of the group formed by yttrium and the elements of the Period Table with an atomic number lying between 57 and 71 inclusive.

Unless otherwise indicated the contents are given as oxides. The cerium oxide is in ceric oxide form.

It should be pointed out that in the rest of the description, unless otherwise indicated, in the ranges of values given the limiting values are inclusive.

The compositions of the invention have two embodiments that differ by the nature of their constituents. According to the first embodiment, these compositions essentially consist of cerium oxide and zirconium oxide. By this it is meant that the composition contains no other oxide of another element that can be a stabilizer for the surface of the latter, in the form of a rare earth other than cerium.

The relative proportions of cerium oxide and zirconium oxide may vary widely. Thus, the cerium oxide/zirconium oxide mass ratio may for example vary between about 10/90 and about 90/10, more particularly between 20/80 and 60/40 and even more particularly between 20/80 and 40/60.

In the case of the second embodiment of the invention, the compositions are based on cerium oxide, zirconium oxide and at least one oxide of a rare earth other than cerium. In this case, the compositions therefore contain at least three oxides and, more particularly four. The rare earth other than cerium may especially be chosen from yttrium, lanthanum, neodymium and praseodymium and combinations thereof. Thus, as compositions according to this second embodiment, mention may more particularly be made of those based on cerium oxide, zirconium oxide and lanthanum oxide, those based on cerium oxide, zirconium oxide, lanthanum oxide and neodymium oxide and those based on cerium oxide, zirconium oxide, lanthanum oxide and praseodymium oxide.

Again in the case of this second embodiment, the content of oxide of the rare earth other than cerium is generally at most 30% by weight and especially at most 20% by weight relative to the overall composition. This content may more particularly be at most 15% and even more particularly at most 10%. Usually it is also at least 1% and more particularly at least 5%. In the case of this second embodiment, the cerium oxide/zirconium oxide mass ratio may vary especially between 0.25 and 4, more particularly between 0.25 and 2 and even more particularly between 0.25 and 1.

The essential feature of the compositions of the invention is the stability of their surface area between 900° C. and 1000° C. As regards the present description, this stability is measured by the change between the surface area ($S_{900}$) exhibited after calcination at 900° C. for 4 hours, the surface area ($S_{1000}$) exhibited after calcination at 1000° C. for 10 hours and the surface area ($S_{1200}$) exhibited after calcination at 1200° C. for 10 hours, this change being expressed by the respective ratios ($S_{900}$-$S_{1000}$)/$S_{900}$ and ($S_{1000}$-$S_{1200}$)/$S_{1000}$ expressed in %.

In the case of the first embodiment, this change between 900° C. and 1000° C. is at most 20%. In the case of the second embodiment, this change between 900° C. and 1000° C. is at most 15%.

These changes may be even smaller, that is to say less than 10% or even less than 5%. According to a preferred embodiment, these changes may be zero or close to 0.

This stability may also be observed between 900° C. and 1100° C., that is to say the changes in surface area given above, between 900° C. and 1000° C. (in particular at most 20% and at most 15% according to the first and second embodiments respectively), likewise apply within the range from 900° C./4 hours to 1100° C./10 hours.

This stability is also manifested at higher temperature. Thus, after a third calcination at 1200° C., the compositions exhibit a change in specific surface area, measured between the value of the surface area after calcination at 1000° C. and that of the surface area after calcination at 1200° C., of at most 75%, preferably at most 60%.

The specific surface areas of the compositions of the invention may vary widely. In general, the specific surface area after calcination at 900° C. for 4 hours is at least 8 m$^2$/g. In the case of the compositions according to the second embodiment, this surface area may more particularly be especially at least 15 m$^2$/g. The invention makes it possible to obtain under the same time and temperature conditions, compositions having surface areas ranging up to at least 15 m$^2$/g for those of the first embodiment and at least up to 35 m$^2$/g for those of the second embodiment. After 10 hours at 1000° C., substantially identical values may be exhibited owing to the stability of the surface area between these two temperatures.

After calcination at 1200° C. for 10 hours, the compositions of the invention exhibit a surface area of at least 3 m$^2$/g, preferably at least 5 m$^2$/g and more particularly at least 8 m$^2$/g, especially in the case of compositions according to the second embodiment in respect of these last two values.

The compositions of the invention furthermore have as additional property a substantially constant OSC (oxygen storage capacity) between 900° C. and 1000° C. Thus, for a product calcined at 1000° C., the reduction in OSC is at most 20%, preferably at most 15%, relative to the OSC value of the product calcined at 900° C.

The compositions of the invention also have a specific porosity. This is because they contain mesopores, that is to say pores having a size of between 10 nm and 200 nm and having a distribution centered around 50 nm approximately. This pore size and this pore distribution are substantially identical in the case of compositions calcined at 900° C. and then at 1100° C. These size values are obtained by mercury porosymmetry (analysis carried out using a Micromeritic Autopore 9410 porosimeter comprising two low-pressure stations and one high-pressure station).

The method of preparing the compositions of the invention will now be described.

The first step of the method therefore consists in preparing a mixture in a liquid medium of a zirconium compound, a cerium compound and optionally of the aforementioned rare earth.

The mixing is generally carried out in a liquid medium, which is preferably water.

The compounds are preferably soluble compounds. These may especially be zirconium, cerium and rare earth salts. These compounds may be chosen from nitrates, sulfates, acetates, chlorides and ceric ammonium nitrates.

As examples, mention may thus be made of zirconium sulfate, zirconyl nitrate or zirconyl chloride. Most generally, zirconyl nitrate is used. Mention may also be especially be made of cerium (IV) salts such as, for example, nitrates or ceric ammonium nitrates, which are particularly suitable here. Ceric nitrate may be used. It is advantageous to use salts with a purity of at least 99.5% and more particularly at least 99.9%. An aqueous ceric nitrate solution may for example be obtained by the reaction of nitric acid on a hydrated ceric oxide prepared conventionally by reacting a solution of a cerous salt, for example cerous nitrate, with an ammonia solution in the presence of hydrogen peroxide. It is also possible in particular to use a ceric nitrate solution obtained by the method of electrolytic oxidation of a cerous nitrate solution, as described in the document FR-A-2 570 087, which constitutes here an advantageous raw material.

It should be noted here that the aqueous solutions of cerium salts and zirconyl salts may have a certain initial free acidity, which can be adjusted by the addition of a base or an acid. However, it is equally possible to employ an initial solution of cerium and zirconium salts having actually a certain free acidity as mentioned above and solutions that will have been neutralized beforehand to a greater or lesser extent. This neutralization may be carried out by the addition of a basic compound to the aforementioned mixture so as to limit this acidity. This basic compound may for example be an ammonia solution or a solution of alkali metal (sodium, potassium, etc.) hydroxides, but preferably an ammonia solution.

Finally, it should be noted that, when the starting mixture contains a cerium compound in which cerium is in the Ce(III) form, it is preferable to employ, during the method, an oxidizing agent, for example hydrogen peroxide. This oxidizing agent may be used by being added to the reaction mixture during step (a) or during step (b), especially at the end of the latter step.

It is also possible to use a sol as starting compound of zirconium or cerium. The term "sol" denotes any system consisting of fine solid particles of colloidal dimensions, that is to say dimensions of between about 1 nm and about 500 nm, based on a zirconium or cerium compound, this compound generally being a zirconium or cerium oxide and/or hydrated oxide, in suspension in an aqueous liquid phase, said particles furthermore optionally being able to contain residual amounts of bonded or adsorbed ions, such as for example nitrate, acetate, chloride or ammonium ions. It should be noted that, in such a sol, the zirconium or cerium may be either completely in the form of colloids, or simultaneously in the form of ions and in the form of colloids.

It does not matter whether the mixture is obtained from compounds initially in the solid state, which will subsequently be introduced into an aqueous stock for example, or directly from solutions of these compounds, said solutions then being mixed in any order.

In the second step (b) of the method, said mixture is brought into contact with a basic compound. As base or basic compound, it is possible to use products of the hydroxide type. Mention may be made of alkali metal or alkaline-earth metal hydroxides. It is also possible to use secondary, tertiary or quaternary amines. However, amines and aqueous ammonia may be preferred in so far as they reduce the risks of contamination by alkali metal or alkaline-earth metal cations. Mention may also be made of urea. The basic compound is generally used in the form of an aqueous solution.

The way in which the mixture and the solution are brought into contact with each other, that is to say the order of introduction thereof, is not critical. However, this contacting may be carried out by introducing the mixture into the solution of the basic compound.

The contacting or the reaction between the mixture and the solution, especially the addition of the mixture into the solution of the basic compound, may be carried out in a single step, gradually or continuously, and it is preferably performed with stirring. It is preferably carried out at room temperature.

The next step (c) of the method is the step of heating the precipitate in aqueous medium.

This heating may be carried out directly on the reaction mixture obtained after reaction with the basic compound or on a suspension obtained after separating the precipitate from the reaction mixture, optionally washing it and putting it back into water. The temperature at which the medium is heated is at least 100° C. and even more preferably at least 130° C. The heating operating may be carried out by introducing the liquid medium into a sealed chamber (a closed reactor of the autoclave type). Under the temperature conditions given above, and in aqueous medium, it may be specified, by way of illustration, that the pressure in the closed reactor may vary between a value greater than 1 bar ($10^5$ Pa) and 165 bar ($1.65 \times 10^7$ Pa), preferably between 5 bar ($5 \times 10^5$ Pa) and 165 bar ($1.65 \times 10^7$ Pa). The heating may also be carried out in an open reactor for temperatures close to 100° C.

The heating may be carried out either in air or in an inert gas atmosphere, preferably in nitrogen.

The duration of the heating may vary widely, for example between 1 and 48 hours, preferably between 2 and 24 hours. Likewise, the rate at which the temperature rises is not critical—it is thus possible to reach the fixed reaction temperature by heating the medium for example between 30 minutes and 4 hours, these values being given merely by way of indication.

The heated medium generally has a pH of at least 5. Preferably, this pH is basic, that is to say it is greater than 7 and more particularly at least 8.

It is possible to carry out several heating operations. Thus, the precipitate obtained after the heating step and optionally a washing operation may be resuspended in water and then another heating operation may be carried out on the medium thus obtained. This other heating operation is carried out under the same conditions as those described for the first one.

In a next step (d) of the method, a surfactant that is chosen from those of the carboxymethylated fatty alcohol ethoxylate type is added to the precipitate thus obtained.

The term "product of the carboxymethylated fatty alcohol ethoxylate type" is understood to mean products composed of ethoxylated or propoxylated fatty alcohols having a $CH_2$—COOH group at the chain end.

These products may correspond to the formula:

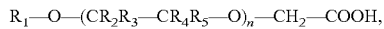

$$R_1\text{—}O\text{—}(CR_2R_3\text{—}CR_4R_5\text{—}O)_n\text{—}CH_2\text{—}COOH,$$

in which $R_1$ denotes a saturated or unsaturated carbon chain, the length of which is generally at most 22 carbon atoms, preferably at least 12 carbon atoms; $R_2$, $R_3$, $R_4$ and $R_5$ may be identical and represent hydrogen or else $R_2$ may represent a $CH_3$ group and $R_3$, $R_4$ and $R_5$ represent hydrogen; n is a nonzero integer that can range up to 50 and more particularly is between 5 and 15, these values being inclusive. It should be noted that a surfactant may consist of a mixture of products of the above formula in which $R_1$ may be saturated and unsaturated respectively or else products comprising both —$CH_2$—$CH_2$—O— and —$C(CH_3)$—$CH_2$—O— groups.

It should also be noted that it is quite possible to use several surfactants of the above type as a mixture.

The addition of the surfactant may be carried out in two ways. It may be added directly to the suspension of precipitate obtained from the preceding heating step. It may also be added to the solid precipitate after the latter has been separated by any known means from the medium in which the heating took place.

The amount of surfactant used may vary between about 30% and 200% and especially between 50% and 200%, these amounts being expressed by weight of surfactant relative to the weight of the composition. More particularly, this amount may be between 50% and 150% and even more particularly between 50% and 100%.

In a final step of the method, the recovered precipitate is then calcined. This calcination allows the crystallinity of the product formed to be increased, and it may also be adjusted and/or chosen depending on the subsequent use temperature reserved for the composition according to the invention, taking into account the fact that the specific surface area of the product is lower the higher the calcination temperature employed. Such a calcination is generally carried out in air, but a calcination carried out for example in an inert gas or in a controlled (oxidizing or reducing) atmosphere is of course not excluded.

In practice, the calcination temperature is generally limited to a range of values between 300 and 900° C.

The compositions of the invention, as described above or as obtained in the method studied above, are in the form of powders, but they may optionally be formed into granules, beads, cylinders or honeycombs of varying dimensions.

The compositions of the invention may be used as catalysts or as catalyst supports. Thus, the invention also relates to catalytic systems comprising the compositions of the invention. For such systems, these compositions may be applied to any support normally used in the catalysis field, that is to say, in particular, thermally inert supports. This support may be chosen from alumina, titanium oxide, cerium oxide, zirconium oxide, silica, spinels, zeolites, silicates, crystalline silicon aluminum phosphates and crystalline aluminum phosphates.

The compositions may also be used in catalytic systems including a wash coat having catalytic properties and based on these compositions, on a substrate for example of the metal or ceramic monolith type. The wash coat may itself include a support of the type of those mentioned above. This wash coat is obtained by mixing the composition with the support so as to form a suspension that may then be deposited on the substrate.

These catalytic systems, and more particularly the compositions of the invention, may have very numerous applications. They are thus particularly well suited to, and therefore usable in, the catalysis of various reactions such as, for example, dehydration, hydrosulfurization, hydrodenitrification, desulfuriza-tion, hydrodesulfurization, dehydrohalogenation, reforming, steam reforming, cracking, hydrocracking, hydrogenation, dehydrogenation, isomerization, dismutation, oxychlorination and dehydrocyclization of hydrocarbons or other organic compounds, oxidation and/or reduction reactions, the Claus reaction, the treatment of internal combustion exhaust gases, demetalization, methanation, shift conversion, catalytic oxidation of soot emitted by internal combustion engines, such as diesel or petrol engines operating in lean mode. Finally, the catalytic systems and the compositions of the invention may be used as NOx traps.

In the case of these uses in catalysis, the compositions of the invention may be employed in combination with precious metals, said compositions thus acting as support for these metals. The nature of support metals and the techniques of incorporating them into support compositions are well known to those skilled in the art. For example, the metals may be platinum, rhodium, palladium or iridium, and they may especially be incorporated into the compositions by impregnation.

Among the uses mentioned, the treatment of internal combustion engine exhaust gases (by automobile postcombustion catalysis) constitutes one particularly advantageous application. Consequently, the invention also relates to a method of treating the exhaust gases of internal combustion engines, which is characterized in that a catalytic system as described above or a composition according to the invention and as described above is used as catalyst.

Examples will now be given.

EXAMPLES

Various compositions were prepared according to the operating method given below.

Introduced into a stirred beaker were zirconium nitrate (80 g/l), cerium nitrate in oxidation state III (496 g/l) and, depending on the various compositions prepared, lanthanum nitrate (454 g/l), neodymium nitrate (524 g/l) and/or praseodymium nitrate. Distilled water was then added so as to obtain 1 liter of a solution of these nitrates.

Introduced into a stirred reactor were an aqueous ammonium solution (12 mol/l), hydrogen peroxide (110 volumes) and distilled water was then added so as to obtain a total volume of 1 liter. The amount of aqueous ammonia was calculated so as to represent, in terms of moles, 1.4 times the amount of nitrate ions present in the mixture to be precipitated. The amount of hydrogen peroxide was calculated so as to represent, in moles, 6 times the amount of cerium ions. The solution of nitrates was introduced over 1 hour into the reactor with constant stirring so as to obtain a suspension.

The suspension obtained was placed in a stainless steel autoclave fitted with a stirrer. The temperature of the medium was raised to 150° C. over 2 hours with stirring.

The suspension this obtained was then filtered on a Buchner funnel. A precipitate containing X % oxide by weight was recovered.

A mass Z (g) of a gel containing U % by weight of surfactant was added to a mass Y (g) of the precipitate so as to obtain a uniform paste. The surfactant was a mixture of ethoxylated products of formula R—O(—$CH_2$—$CH_2$—O)$_9$—$CH_2$—COOH in which R is a carbon chain of the $C_{16}H_{33}$ palmitic (saturated) type or of the $C_{18}H_{35}$ oleic (unsaturated chain) type and having an average molecular weight of 825.

The mixture obtained was then heated to 900° C. for 4 hours in stages.

Table 1 below gives the values of X, Y, Z and U for the various examples.

TABLE 1

| Examples | X | Y | Z | U |
|---|---|---|---|---|
| 1 | 18.8 | 50 | 9.4 | 100 |
| 2 | 19 | 50 | 6.17 | 90 |
| 3 | 22.3 | 50 | 7.25 | 90 |
| 4 | 30.5 | 48 | 9.52 | 90 |
| 5 | 25.9 | 50 | 15.15 | 100 |
| 6 | 19.8 | 50 | 3.86 | 90 |

Table 2 below gives the characteristics of the compositions prepared.

TABLE 2

| Example | Composition | Proportion (% by weight of oxide) |
|---|---|---|
| 1 | $ZrO_2/CeO_2/La_2O_3/Nd_2O_3$ | 72/21/2/5 |
| 2 | $ZrO_2/CeO_2/La_2O_3/Nd_2O_3$ | 65/22/6.5/6.5 |
| 3 | $ZrO_2/CeO_2/La_2O_3$ | 55/40/5 |
| 4 | $ZrO_2/CeO_2/La_2O_3/Pr_2O_3$ | 30/60/3/7 |
| 5 | $ZrO_2/CeO_2$ | 60/40 |
| 6 | $ZrO_2/CeO_2/La_2O_3/Nd_2O_3$ | 72/21/2/5 |

The composition of Example 1 after calcination at 1100° C. exhibited mesopores having a size of between 20 nm and 200 nm with a distribution centered around 50 nm.

Table 3 below gives, for the various examples, the surface areas and their change at various temperatures.

TABLE 3

| | Specific surface area in $m^2/g$ | | | | |
|---|---|---|---|---|---|
| Example | 900° C. (4 h) | 1000° C. (10 h) | Change* | 1200° C. (10 h) | Change** |
| 1 | 21.2 | 20.3 | 4% | 9.6 | 50% |
| 2 | 18.2 | 17.3 | 5% | 10 | 40% |
| 3 | 16 | 14.7 | 8% | 8.4 | 39% |
| 4 | 12.3 | 11.7 | 5% | 5.7 | 49% |
| 5 | 10.7 | 10.5 | 2% | 5 | 51% |
| 6 | 29 | 29 | 0% | 10 | 66% |

*Change in surface area in % between 900° C. and 1000° C.;
**Change in surface area in % between 1000° C. and 1200° C..

The composition of Example 1 furthermore had a surface area of 20 $m^2/g$ after calcination at 1100° C. for 10 hours.

The changes in dynamic OSC of the product of Example 1 were also measured using the following method.

30 mg of product were calcined beforehand at 900° C. for 4 hours in the case of a first specimen and at 1200° C. for 4 hours in the case of a second specimen. The specimen was placed in a reactor, the temperature of which could be regulated to 350° C., 400° C. and 450° C. Defined amounts of CO (5% in helium) and of $O_2$ (2.5% in helium) were injected alternately into this reactor, at a frequency of 1 Hz (one injection for 1 second) and at a flow rate of 200 $cm^3/m$. The CO and $O_2$ contents at the outlet of the reactor were analyzed using a mass spectrometer.

The OSC was expressed in ml of $O_2$ per gram per second using the formula:

$$OSC(ml.g^{-1}.s^{-1}) = [\Delta(CO) \times d\ CO]/(2 \times P)$$

in which $\Delta(CO)$ represents the amount of CO converted each second, dCO represents the CO flow rate and P represents the mass of the specimen.

Table 4 below gives the changes in OSC of the product of Example 1.

TABLE 4

| | OSC (ml $O_2$/g/s) Temperature | |
|---|---|---|
| | 900° C. | 1200° C. |
| Example 1 | 0.25 | 0.22 |

The invention claimed is:

1. A composition consisting essentially of a cerium oxide and a zirconium oxide, wherein after a first calcination at 900° C. for 4 hours followed by a second calcination at 1000° C. for 10 hours, the composition exhibits a change in its specific surface area of at most 5%.

2. The composition as claimed in claim 1, wherein the composition exhibits a specific surface area of at least 8 $m^2/g$ after calcination at 900° C. for 4 hours.

3. A composition comprising a cerium oxide, a zirconium oxide and at least one oxide of a rare earth other than cerium, wherein after a first calcination at 900° C. for 4 hours followed by a second calcination at 1000° C. for 10 hours, the composition exhibits a change in its specific surface area of at most 5%.

4. The composition as claimed in claim 3, wherein the composition exhibits a specific surface area of at least 8 m²/g after calcination at 900° C. for 4 hours.

5. A composition consisting essentially of a cerium oxide and a zirconium oxide, wherein after a first calcination at 900° C. for 4 hours followed by a second calcination at 1000° C. for 10 hours, the composition exhibits a change in its specific surface area of at most 20%; and wherein after a first calcination at 900° C. for 4 hours followed by a second calcination at 1100° C. for 10 hours, the composition exhibits a change in its specific surface area of at most 20%.

6. The composition as claimed in claim 5, wherein the composition exhibits a specific surface area of at least 8 m²/g after calcination at 900° C. for 4 hours.

7. The composition as claimed in claim 5, wherein the composition exhibits a specific surface area of at least 8 m²/g after calcination at 1000° C. for 4 hours.

8. The composition as claimed in claim 5, wherein the composition exhibits a specific surface area of at least 3 m²/g after calcination at 1200° C. for 10 hours.

9. The composition as claimed in claim 5, wherein after a first calcination at 900° C. for 4 hours followed by a second calcination at 1000° C. for 10 hours, the composition exhibits a change in its specific surface area of at most 10%.

10. The composition as claimed in claim 5, wherein, after a third calcination at 1200° C. the composition exhibits a change in specific surface area between to the specific surface area after calcination at 1000° C. for 10 hours, and the specific surface area after calcination at 1200° C. for 10 hours, of at most 75%.

11. The composition as claimed in claim 5, wherein, after a third calcination at 1200° C. the composition exhibits a change in specific surface area between the specific surface area after calcination at 1000° C. for 10 hours, and the specific surface area after calcination at 1200° C. for 10 hours, of at most 60%.

12. The composition as claimed in claim 5, wherein the composition comprises a cerium oxide/zirconium oxide mass ratio of 10/90 to 90/10.

13. A composition comprising a cerium oxide, a zirconium oxide and at least one oxide of a rare earth other than cerium, wherein after a first calcination at 900° C. for 4 hours followed by a second calcination at 1000° C. for 10 hours, the composition exhibits a change in its specific surface area of at most 15%; and wherein, after a first calcination at 900° C. for 4 hours followed by a second calcination at 1100° C. for 10 hours, the composition exhibits a change in its specific surface area of at most 20%.

14. The composition as claimed in claim 13, wherein the composition exhibits a specific surface area of at least 15 m²/g after calcination at 900° C. for 4 hours.

15. The composition as claimed in claim 13, wherein the composition exhibits a specific surface area of at least 8 m²/g after calcination at 1000° C. for 4 hours.

16. The composition as claimed in claim 13, wherein the composition exhibits a specific surface area of at least 3 m²/g after calcination at 1200° C. for 10 hours.

17. The composition as claimed in claim 13, wherein the composition exhibits a specific surface area of at least 8 m²/g after calcination at 1200° C. for 10 hours.

18. The composition as claimed in claim 13, wherein after a first calcination at 900° C. for 4 hours followed by a second calcination at 1000° C. for 10 hours, the composition exhibits a change in its specific surface area of at most 10%.

19. The composition as claimed in claim 13, wherein, after a third calcination at 1200° C. the composition exhibits a change in specific surface area between the specific surface area after calcination at 1000° C. for 10 hours, and the specific surface area after calcination at 1200° C. for 10 hours, of at most 75%.

20. The composition as claimed in claim 13, wherein, after a third calcination at 1200° C. the composition exhibits a change in specific surface area between the specific surface area after calcination at 1000° C. for 10 hours, and the specific surface area after calcination at 1200° C. for 10 hours, of at most 60%.

21. The composition as claimed in claim 13, wherein the composition comprises a cerium oxide/zirconium oxide mass ratio of 10/90 to 90/10.

22. The composition as claimed in claim 13, wherein the composition comprises a cerium oxide/zirconium oxide mass ratio of 0.25 to 4.00.

23. In combination, the composition of claim 1, and (i) a catalytic material deposited thereon, or (ii) a catalytic support.

24. In combination, the composition of claim 3, and (i) a catalytic material deposited thereon, or (ii) a catalytic support.

25. In combination, the composition of claim 5, and (i) a catalytic material deposited thereon, or (ii) a catalytic support.

26. In combination, the composition of claim 13, and (i) a catalytic material deposited thereon, or (ii) a catalytic support.

* * * * *